US012811956B2

(12) United States Patent
Shim

(10) Patent No.: US 12,811,956 B2
(45) Date of Patent: Nov. 24, 2026

(54) METHOD AND SYSTEM FOR DETECTING LOGIN ANOMALY

(71) Applicant: HOPAE INC., Seoul (KR)

(72) Inventor: Jaehoon Shim, Seoul (KR)

(73) Assignee: HOPAE INC., Seoul (KR)

( * ) Notice: Subject to any disclaimer, the term of this patent is extended or adjusted under 35 U.S.C. 154(b) by 85 days.

(21) Appl. No.: 18/795,836

(22) Filed: Aug. 6, 2024

(65) Prior Publication Data

US 2025/0055858 A1 Feb. 13, 2025

(30) Foreign Application Priority Data

Aug. 10, 2023 (KR) ........................ 10-2023-0104797

(51) Int. Cl.
*H04L 9/40* (2022.01)

(52) U.S. Cl.
CPC ................................ *H04L 63/1416* (2013.01)

(58) Field of Classification Search
None
See application file for complete search history.

(56) References Cited

U.S. PATENT DOCUMENTS

2006/0282660 A1 12/2006 Varghese et al.
2016/0277439 A1* 9/2016 Rotter ................. H04L 63/0861
2020/0293638 A1* 9/2020 Rose ..................... G06F 21/316
2021/0226987 A1 7/2021 Summers et al.
2023/0195863 A1 6/2023 Xu et al.
2025/0030694 A1* 1/2025 Ben Dov .............. H04L 63/102

FOREIGN PATENT DOCUMENTS

CN 110535850 A 12/2019
WO 2022/045873 A1 3/2022

OTHER PUBLICATIONS

Extended European Search Report issued in a related European Patent Application No. 24193007.2 on Nov. 28, 2024.

* cited by examiner

*Primary Examiner* — Boris D Grijalva Lobos
(74) *Attorney, Agent, or Firm* — Hoffmann & Baron, LLP

(57) ABSTRACT

A method for detecting login anomaly is provided. The method includes the steps of: receiving information on a login request made to a service provision server operating a target service; performing an evaluation of whether the received login request is anomalous using an anomaly detection model; and transmitting information on the evaluation to the service provision server.

7 Claims, 2 Drawing Sheets

METHOD AND SYSTEM FOR DETECTING LOGIN ANOMALY

CROSS-REFERENCE TO RELATED APPLICATION(S)

This application claims priority to Korean Patent Application No. 10-2023-0104797 filed on Aug. 10, 2023, the entire contents of which are hereby incorporated by reference.

FIELD OF THE INVENTION

The present invention relates to a method and system for detecting login anomaly.

BACKGROUND

Most services provided via the Web or apps require users to log in, which places service provision servers in a position to handle a large number of login requests from the users.

A user login process works in a manner that a user device sends a login request to a service provision server, and the service provision server validates the login request and allows the user device to access a service provision page. When normal login requests are received, the service provision server has no problem in processing the login requests. However, in real life, when abnormal login requests (e.g., login requests repeatedly received at very short time intervals) are received, the service provision server may have problems in processing the login requests.

In order to solve the above problems, a number of conventional techniques have been introduced to detect whether anomaly events occur in login situations. According to conventional techniques such as FDS (Fraud Detection System), login anomaly is detected by using personal information of users who request login to detect abnormal login requests. However, the conventional techniques are evaluated as having technical limitations because it is often difficult to access the personal information of the users in the real environment, and the burden of maintaining security is increased by using the personal information of the users.

In this connection, the inventor(s) present a technique capable of detecting anomaly in login requests using only a small amount of non-identifying information that can be obtained in login situations.

SUMMARY OF THE INVENTION

One object of the present invention is to solve all the above-described problems in the prior art.

Another object of the invention is to receive information on a login request made to a service provision server operating a target service, perform an evaluation of whether the login request is anomalous using an anomaly detection model, and transmit information on the evaluation to the service provision server.

Yet another object of the invention is to detect anomaly in login requests using only a small amount of non-identifying information that can be obtained in login situations.

Still another object of the invention is to provide a service provision server with only information on an evaluation (e.g., probability or score) regarding anomaly in a login request, and allow the service provision server to directly determine that the login request is anomalous or make a decision to block the login request.

The representative configurations of the invention to achieve the above objects are described below.

According to one aspect of the invention, there is provided a method for detecting login anomaly, the method comprising the steps of: receiving information on a login request made to a service provision server operating a target service; performing an evaluation of whether the received login request is anomalous using an anomaly detection model; and transmitting information on the evaluation to the service provision server.

According to another aspect of the invention, there is provided a system for detecting login anomaly, the system comprising: a login request management unit configured to receive information on a login request made to a service provision server operating a target service; and an anomaly detection unit configured to perform an evaluation of whether the received login request is anomalous using an anomaly detection model, and transmit information on the evaluation to the service provision server.

In addition, there are further provided other methods and systems to implement the invention, as well as non-transitory computer-readable recording media having stored thereon computer programs for executing the methods.

According to the invention, it is possible to receive information on a login request made to a service provision server operating a target service, perform an evaluation of whether the login request is anomalous using an anomaly detection model, and transmit information on the evaluation to the service provision server.

According to the invention, it is possible to detect anomaly in login requests using only a small amount of non-identifying information that can be obtained in login situations.

According to the invention, it is possible to provide a service provision server with only information on an evaluation (e.g., probability or score) regarding anomaly in a login request, and allow the service provision server to directly determine that the login request is anomalous or make a decision to block the login request.

DETAILED DESCRIPTION OF THE INVENTION

Figure 1:
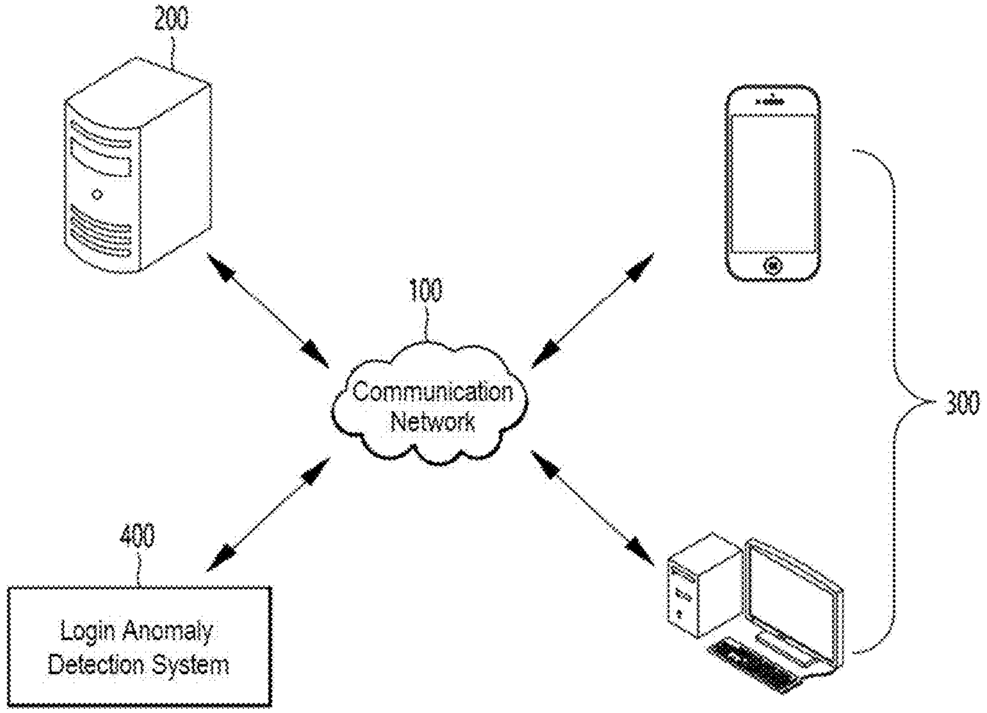
FIG. 1 schematically shows the configuration of an entire system for detecting login anomaly according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the invention will be described in detail with reference to the accompanying drawings to enable those skilled in the art to easily implement the invention.

Configuration of the Entire System

FIG. 1 schematically shows the configuration of the entire system for detecting login anomaly according to one embodiment of the invention.

As shown in FIG. 1, the entire system according to one embodiment of the invention may comprise a communication network 100, a service provision server 200, a device 300, and a login anomaly detection system 400.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth LOW Energy (BLE) communication), infrared communication, and ultrasonic communication. As another example, the communication network 100 may be an optical communication network, at least a part of which may be implemented with a conventional communication scheme such as LiFi (Light Fidelity).

Next, the service provision server 200 according to one embodiment of the invention may be a server capable of connecting to and then communicating with the device 300 or the login anomaly detection system 400.

Next, the device 300 according to one embodiment of the invention is digital equipment capable of connecting to and then communicating with the service provision server 200 or the login anomaly detection system 400, and any type of digital equipment having a memory means and a microprocessor for computing capabilities, such as a smart phone, a tablet, a smart watch, a smart band, smart glasses, a desktop computer, a notebook computer, a workstation, a personal digital assistant (PDA), a web pad, and a mobile phone, may be adopted as the device 300 according to the invention.

In particular, the device 300 may include an application (not shown) for assisting a user to receive services from the service provision server 200 or the login anomaly detection system 400. The application may be downloaded from the service provision server 200, the login anomaly detection system 400, or an external application distribution server (not shown). Meanwhile, the characteristics of the application may be generally similar to those of a login request management unit 410, an anomaly detection unit 420, a communication unit 430, and a control unit 440 of the login anomaly detection system 400 to be described below. Here, at least a part of the application may be replaced with a hardware device or a firmware device that may perform a substantially equal or equivalent function, as necessary.

Next, the login anomaly detection system 400 according to one embodiment of the invention may function to receive information on a login request made to the service provision server 200 operating a target service, perform an evaluation of whether the login request is anomalous using an anomaly detection model, and transmit information on the evaluation to the service provision server 200.

The configuration and functions of the login anomaly detection system 400 according to the invention will be discussed in more detail below.

Configuration of the Login Anomaly Detection System

Hereinafter, the internal configuration of the login anomaly detection system 400 crucial for implementing the invention and the functions of the respective components thereof will be discussed.

Figure 2:
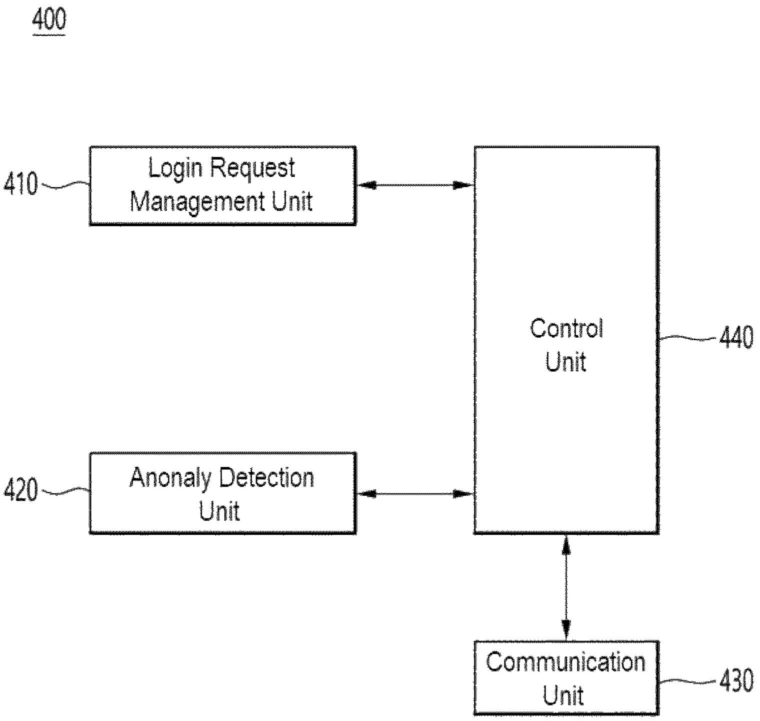
FIG. 2 specifically shows the internal configuration of a login anomaly detection system according to one embodiment of the invention.

FIG. 2 specifically shows the internal configuration of the login anomaly detection system 400 according to one embodiment of the invention.

As shown in FIG. 2, the login anomaly detection system 400 according to one embodiment of the invention may comprise a login request management unit 410, an anomaly detection unit 420, a communication unit 430, and a control unit 440. According to one embodiment of the invention, at least some of the login request management unit 410, the anomaly detection unit 420, the communication unit 430, and the control unit 440 may be program modules to communicate with an external system (not shown). The program modules may be included in the login anomaly detection system 400 in the form of operating systems, application program modules, and other program modules, while they may be physically stored in a variety of commonly known storage devices. Further, the program modules may also be stored in a remote storage device that may communicate with the login anomaly detection system 400. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the login anomaly detection system 400 has been described as above, and it will be apparent to those skilled in the art that at least a part of the components or functions of the login anomaly detection system 400 may be implemented in the service provision server 200, the device 300, or an external server (not shown) or included in an external system (not shown), as necessary.

First, the login request management unit 410 according to one embodiment of the invention may receive information on a login request made to the service provision server 200 operating a target service.

Specifically, according to one embodiment of the invention, the information on the login request may include only non-identifying information excluding personal information of a user. For example, according to one embodiment of the invention, the information on the login request may include information on a time when the login request is made, information on a fingerprint (e.g., MAC address or access location) of a device that makes the login request, and the like.

More specifically, the login request management unit 410 according to one embodiment of the invention may provide the service provision server 200 with a program module that assists the service provision server 200 to collect device fingerprint data.

Further, the login request management unit 410 according to one embodiment of the invention may perform de-identification processing on the information on the login request collected as above.

Next, the anomaly detection unit 420 according to one embodiment of the invention may perform an evaluation of whether the login request received from the service provision server 200 is anomalous using an anomaly detection model.

Specifically, the anomaly detection model of the anomaly detection unit 420 according to one embodiment of the invention may output at least one of a probability, vector, matrix, logit, and coordinate where the login request is associated with a normal state or an anomalous state, and the output may be classified or clustered as normal/anomalous or a particular type of anomaly (e.g., ID theft or excessive login requests) on the basis of predetermined criteria. Here, the criteria used to classify or cluster the output may be preset or dynamically updated during a training process.

For example, the anomaly detection model according to one embodiment of the invention may be based on an artificial neural network and may comprise an input layer, a hidden layer, and an output layer. Meanwhile, the anomaly detection model according to the invention is not necessarily limited to the artificial neural network model listed above, and may be changed to a model that can implement diverse learning algorithms involved in supervised learning, unsupervised learning, reinforcement learning, or deep learning, as long as the objects of the invention may be achieved. As another example, the anomaly detection model according to one embodiment of the invention may be implemented as a rule-based model.

Further, according to one embodiment of the invention, the anomaly detection model may be customized on the basis of attributes of the service provision server 200 or attributes of the target service provided by the service provision server 200. For example, when the target service is a financial service where security should be emphasized, the anomaly detection model according to one embodiment of the invention may be customized and trained to strictly detect anomaly in login requests. As another example, when the target service is a social networking service (SNS) where users are encouraged to participate freely, the anomaly detection model according to one embodiment of the invention may be customized and trained to loosely detect anomaly in login requests.

According to one embodiment of the invention, the anomaly detection unit 420 may include a primary analysis model for analyzing whether the login request is anomalous and a secondary analysis model for analyzing what type of anomaly event the login request determined to have a high probability of being anomalous specifically corresponds to. Here, according to one embodiment of the invention, the primary analysis model may be a light-weighted analysis model that requires relatively few computing resources compared to the secondary analysis model.

Further, the anomaly detection unit 420 according to one embodiment of the invention may transmit a result of the evaluation of whether the login request is anomalous to the service provision server 200.

Specifically, the anomaly detection unit 420 according to one embodiment of the invention may calculate and provide to the service provision server 200 only an evaluation score (or probability) regarding whether the login request is anomalous or what type of anomaly event the login request corresponds to, and may allow the service provision server 200 to directly determine that the login request is anomalous or make a decision to block the login request on the basis of the evaluation score (or probability).

For example, the anomaly detection unit 420 according to one embodiment of the invention may calculate a probability (0.7) that a login request A is anomalous using the anomaly detection model and transmit the probability to the service provision server 200, and the service provision server 200 may make a final determination of whether the login request A is anomalous on the basis of its own criteria, with reference to the probability (0.7) received from the login anomaly detection system 400.

Further, the anomaly detection unit 420 according to one embodiment of the invention may interwork with a third party service such that a notification regarding the login anomaly detection is provided to the service provision server 200 or the user device 300.

Next, the communication unit 430 according to one embodiment of the invention may function to enable data transmission/reception from/to the login request management unit 410 and the anomaly detection unit 420.

Lastly, the control unit 440 according to one embodiment of the invention may function to control data flow among the login request management unit 410, the anomaly detection unit 420, and the communication unit 430. That is, the control unit 440 according to one embodiment of the invention may control data flow into/out of the login anomaly detection system 400 or data flow among the respective components of the login anomaly detection system 400, such that the login request management unit 410, the anomaly detection unit 420, and the communication unit 430 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks, and magnetic tapes; optical media such as compact disk-read only memory (CD-ROM) and digital versatile disks (DVDs); magneto-optical media such as floptical disks; and hardware devices such as read-only memory (ROM), random access memory (RAM), and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system of detecting login anomaly, the system comprising one or more processors, the method comprising:

receiving by the one or more processors information on a login request made to a service provision server operating a target service;

performing by the one or more processors an evaluation of whether the received login request is anomalous using an anomaly detection model; and transmitting by the one or more processors information on the evaluation to the service provision server, the service provision server capable of providing or not providing the target service based at least on the information of the evaluation as to whether the login request is anomalous, wherein the anomaly detection model is customized and trained to detect anomaly in the received login request based on attributes of the target service, such that a criterion for the evaluation of whether the received login request is anomalous is set according to the attributes of the target service, wherein the anomaly detection model includes a primary analysis model to analyze whether the received login request is anomalous and a secondary analysis model to analyze what type of anomaly event corresponds to a login request that is determined to have a high probability of being anomalous by the primary analysis model, and wherein the primary analysis model is a light-weighted analysis model that requires few computing resources compared to the secondary analysis model.

2. The method of claim 1, wherein the information on the login request includes information on device fingerprint data excluding personal information of a user.

3. The method of claim 1, wherein receiving the information comprises de-identification processing performed on the information on the login request.

4. A non-transitory computer-readable recording medium having stored thereon a computer program for executing the method of claim 1.

5. A system to detect login anomaly, the system comprising one or more processors configured to:

receive information on a login request made to a service provision server operating a target service and perform an evaluation of whether the received login request is anomalous using an anomaly detection model; and transmit information on the evaluation to the service provision server, the service provision server capable of providing or not providing the target service based at least on the information of the evaluation as to whether the login request is anomalous, wherein the anomaly detection model is customized and trained to detect anomaly in the received login request based on attributes of the target service, such that a criterion for the evaluation of whether the received login request is anomalous is set according to the attributes of the target service, wherein the anomaly detection model includes a primary analysis model to analyze whether the received login request is anomalous and a secondary analysis model to analyze what type of anomaly event corresponds to a login request that is determined to have a high probability of being anomalous by the primary analysis model, and wherein the primary analysis model is a light-weighted analysis model that requires few computing resources compared to the secondary analysis model.

6. The system of claim 5, wherein the information on the login request includes information on device fingerprint data excluding personal information of a user.

7. The system of claim 5, wherein the one or more processors are configured to perform de-identification processing on the information on the login request.

* * * * *